US011044268B2

(12) United States Patent
Pastore et al.

(10) Patent No.: US 11,044,268 B2
(45) Date of Patent: Jun. 22, 2021

(54) SYSTEMS AND METHODS FOR IDENTIFYING INTERNET ATTACKS (71) Applicants: Nicolò Pastore, Pero (IT); Carmine Giangregorio, Milan (IT); Paolo Rimmaudo, Cinisello Balsamo (IT); Matteo Paolo Bogana, Cerano (IT)

(72) Inventors: Nicolò Pastore, Pero (IT); Carmine Giangregorio, Milan (IT); Paolo Rimmaudo, Cinisello Balsamo (IT); Matteo Paolo Bogana, Cerano (IT)

( * ) Notice: Subject to any disclaimer, the term of this patent is extended or adjusted under 35 U.S.C. 154(b) by 0 days.

(21) Appl. No.: 14/939,888

(22) Filed: Nov. 12, 2015

(65) Prior Publication Data
US 2016/0142428 A1    May 19, 2016

Related U.S. Application Data (60) Provisional application No. 62/079,337, filed on Nov. 13, 2014.

(30) Foreign Application Priority Data

Nov. 13, 2014 (EP) .................................... 14192969

(51) Int. Cl.
H04L 29/06 (2006.01)
H04L 29/08 (2006.01)
(Continued)

(52) U.S. Cl.
CPC ........ H04L 63/1466 (2013.01); G06F 21/554 (2013.01); H04L 41/0273 (2013.01);
(Continued)

(58) Field of Classification Search
CPC . H04L 63/14; H04L 63/1408; H04L 63/1416; H04L 63/1425; H04L 63/1433;
(Continued)

(56) References Cited

U.S. PATENT DOCUMENTS 8,225,401 B2 *   7/2012  Sobel .................... G06F 21/554
                                                  713/168
8,869,281 B2 *  10/2014  Call ..................... H04L 63/1425
                                                  726/23

(Continued)

Primary Examiner — Zachary A. Davis
(74) Attorney, Agent, or Firm — MH2 Technology Law Group, LLP (57) ABSTRACT A system for identifying Internet attacks may include: a Web server having a Web application residing therein; a Traffic inspector; and a Traffic Analyzer. The Traffic Inspector may add an agent code portion to DOM server code received from the Web server to thereby generate DOM client code, and may send the DOM client code to a Web browser residing in at least one client computer. The Web browser may automatically generate DOM rendered code. The agent code portion may automatically instruct the Web browser to send the DOM rendered code to the Traffic inspector. The Traffic Inspector may send at least the DOM client code and the DOM rendered code to the Traffic Analyzer. An algorithm application residing in the Traffic Analyzer may process the DOM rendered code and to compare the processed DOM rendered code with the DOM client code to identify at least one code difference.

19 Claims, 5 Drawing Sheets (51) Int. Cl.
*G06F 21/55* (2013.01)
*H04L 12/24* (2006.01)
*H04L 12/26* (2006.01)

(52) U.S. Cl.
CPC .......... *H04L 43/08* (2013.01); *H04L 63/1416* (2013.01); *H04L 67/02* (2013.01); *G06F 2221/032* (2013.01); *G06F 2221/2119* (2013.01)

(58) Field of Classification Search
CPC .................. H04L 63/1441; H04L 63/145; H04L 63/1466
See application file for complete search history.

(56) References Cited

U.S. PATENT DOCUMENTS

| | | | |
|---|---|---|---|
| 8,892,687 B1 * | 11/2014 | Call | H04L 29/06972 707/756 |
| 9,075,990 B1 * | 7/2015 | Yang | G06F 21/55 |
| 9,225,737 B2 * | 12/2015 | Call | H04L 63/1425 |
| 9,270,647 B2 * | 2/2016 | Call | |
| 9,584,543 B2 * | 2/2017 | Kaminsky | H04L 63/168 |

* cited by examiner

SYSTEMS AND METHODS FOR IDENTIFYING INTERNET ATTACKS

CROSS-REFERENCE TO RELATED APPLICATION

This application claims the benefit of U.S. Provisional Application Ser. No. 62/079,337 filed Nov. 13, 2014, and also claims priority from European Patent Application No. 14192969.5 filed Nov. 13, 2014, both of which are incorporated herein by reference.

BACKGROUND

Field

The present disclosure relates to a system and a method of detecting and counteracting Internet attacks.

Particularly, the present disclosure relates to a system and a method of detecting and counteracting Man-in-the-Browser and/or Man-in-the-Middle attacks. In other words, the present invention allows monitoring and protection of a Web application (or a Web server) against attacks directed to the Web browser of a client.

Related Art

Antivirus software is known to be used in the art for counteracting computer security attacks, including Man-in-the-Browser and/or Man-in-the-Middle attacks. Man-in-the-Browser is a type of attack that consists in direct manipulation of the Web browser to change the contents that are normally displayed to the user when he/she visits a Website. Man-in-the-Browser attacks are carried out using malware installed on the computer without the user's knowledge. Such malware (e.g. Proxy Trojan horses) interact with the memory of Web browser processes, to redirect the normal flow of system calls (used by the Web browser) to certain malware functions, which have the purpose, for instance, of injecting additional HTML code into the downloaded Web page. It should be noted that, in the case of the Man-in-the-Browser attack, a connection is established with the original Web server of the site that has been attacked, which makes attack detection difficult. Therefore, the Web browser and the Web application are unable to identify the content that has been added by the malware to the content that has been actually downloaded by the Web browser. Various Man-in-the-Browser attacks have been acknowledged, including credit card data theft from e-banking and e-commerce sites and fraudulent transactions that are often automatically started with no interaction with the user.

In more detail, when a user requests a Web page (e.g., a Web application) through a Web browser, the Web server that hosts the Web page sends HTML source code (a Document Object Model ("DOM")) to the Web browser. The DOM code is transferred to the rendering engine of the Web browser for display to the user. For example, in a malware-infected personal computer ("PC"), the DOM code received by the Web browser from the Web server is changed by the malware before it is processed by the rendering engine of the Web browser. For this purpose, the malware injects an additional code (e.g., a script) into the DOM code it has received from the Web server to change the contents displayed to the user. The changes made by the malware to the DOM code downloaded from the Web server are changes in the HTML, JavaScript codes, and/or any other contents or Web resource. As mentioned above, the Web browser is connected to the original Web server, with changes that may include graphical and/or behavioral alterations. Therefore, a modified Web page is displayed to the user, which reproduces the Web page that was originally requested by the client. The client unwillingly allows access to its own personal data or authorizes fraudulent transactions on his/her own account.

For example, in the field of banking, a malware-infected computer typically logs into the on-line banking site using a HTTPS protocol, and downloads the Web page data. Nevertheless, the malware alters this data in real-time, by adding transaction-manipulating scripts, and performing, for instance, automatic money transfers. The script can also redirect money transfers that were actually ordered by the user to other recipients, or more simply request credit card data and/or add additional fields to be filled in by the user with additional data.

Related Art Issues

Antivirus software, installed either in PCs or in client user devices (e.g. smartphones, tablets, etc.) are poorly effective against this type of computer security threat. Antivirus software can only identify part of Man-in-the-Browser attacks occurring over the Internet. Web browsers are also known which meet high security standards or have Internet security software. Nevertheless, none of the prior art solutions can effectively counteract Man-in-the-Browser.

SUMMARY OF THE INVENTION

It is an object of the present invention to provide a system for preventing Internet attacks.

A further object of the present invention is to provide a method which employs such system to prevent Man-in-the-Browser attacks.

Another object of this invention is to provide a system for detecting the changes made by a malware to the HTML and/or javascript codes of the DOM of the Web page and/or Web resource that has been downloaded by a user and certify that the contents and/or DOM of the Web resource and/or page transmitted to a given client is actually what is displayed to or used by it.

Yet another object of the present invention to provide a method of preventing Internet attacks.

Advantages of the Invention

One embodiment provides a system that interposes in HTTP and/or HTTPS requests made by a user between the Web browser and the Web application being monitored.

A further embodiment provides a system and a method that employs such system for identifying any alteration to the DOM code that has been actually downloaded from the Web application. This will allow identification of a Man-in-the-Browser attack, to ensure that the requested Web page will be properly displayed to the user.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Even when this is not expressly stated, the individual features as described with reference to the particular embodiments shall be intended as auxiliary to and/or interchangeable with other features described with reference to other exemplary embodiments.

The present invention relates to a system 1 for identifying Internet attacks, particularly Man-in-the-Browser attacks.

Figure 1:
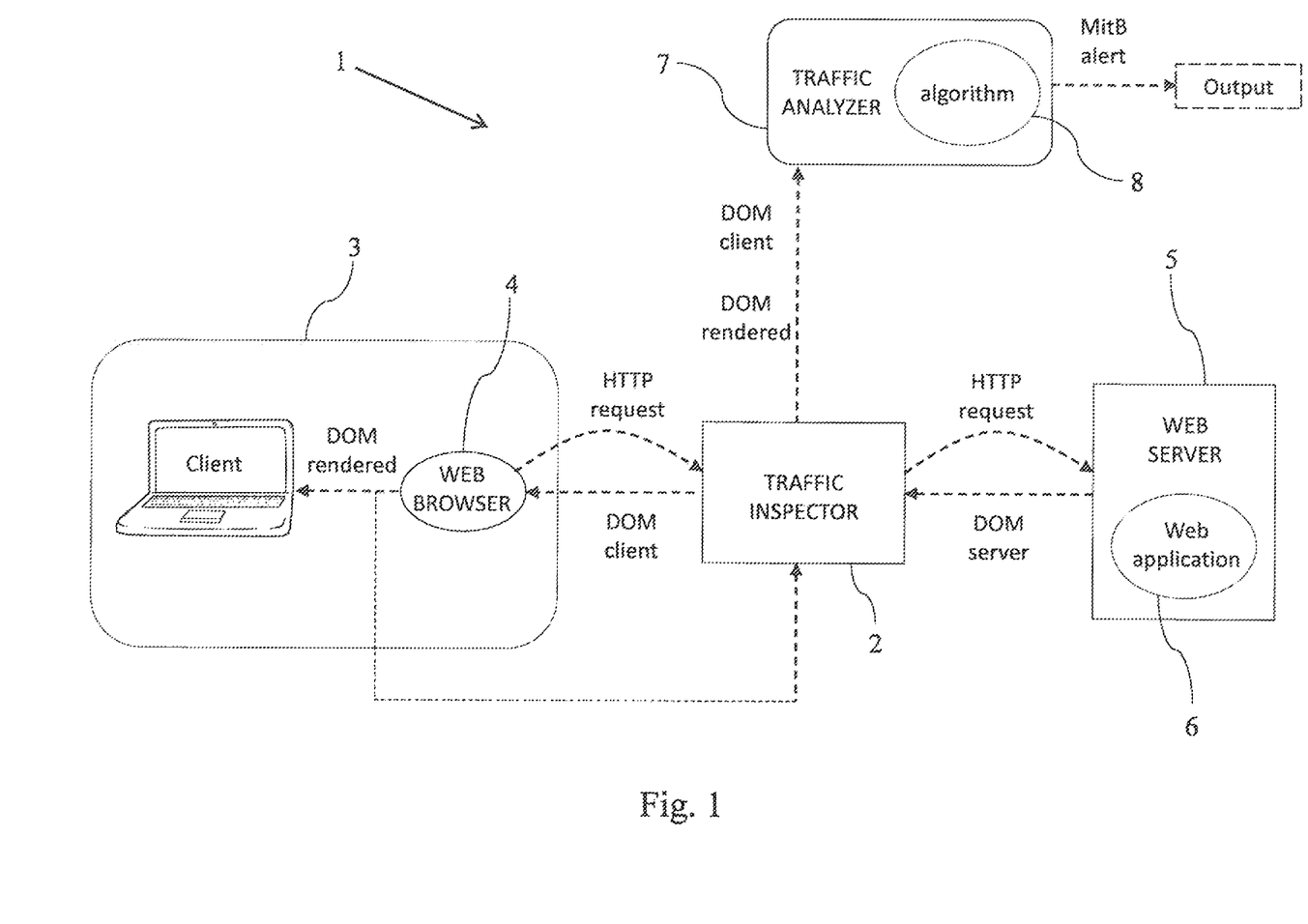
FIG. 1 shows an embodiment of a system for identifying and preventing Internet attacks, according to the present disclosure.
Figure 2:
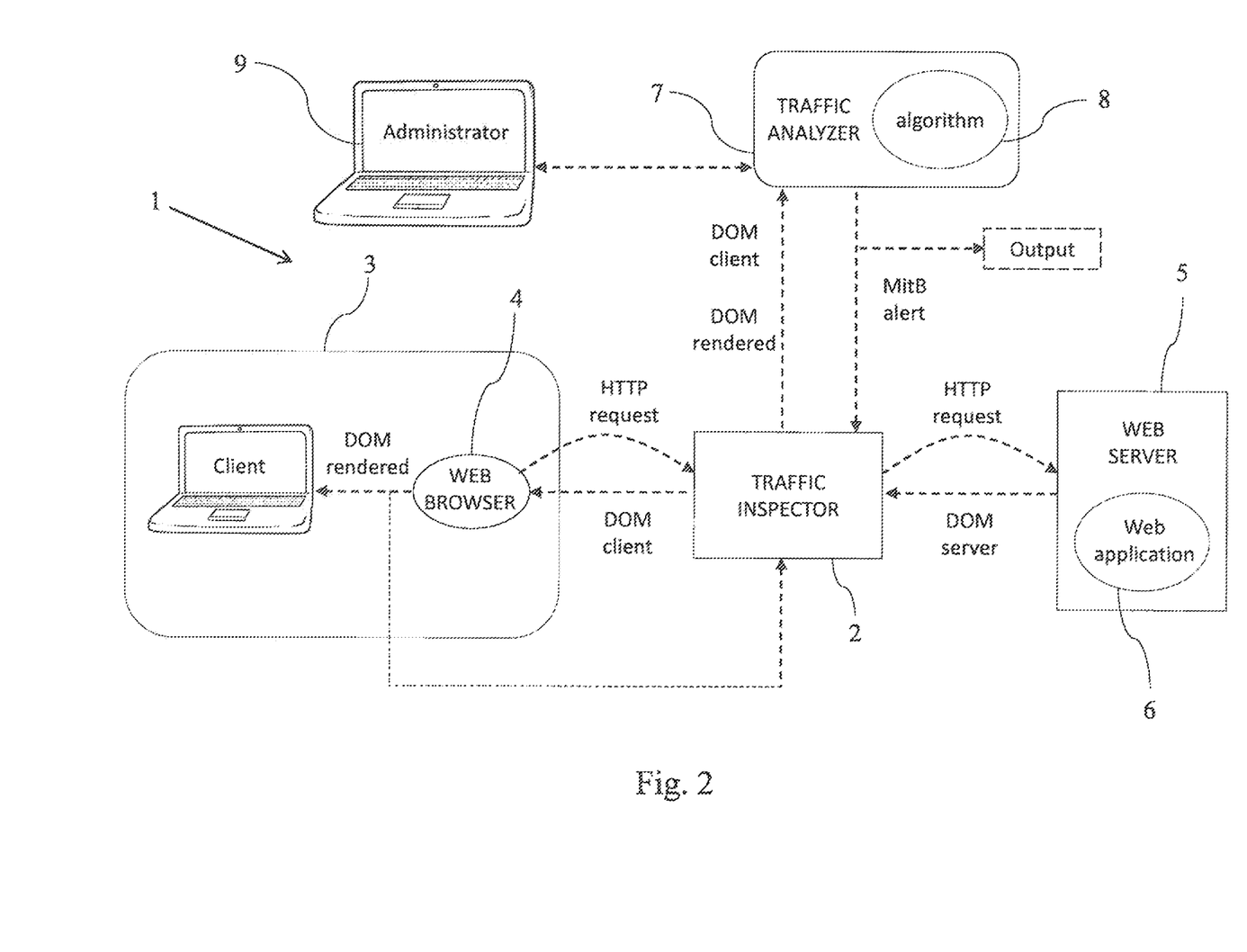
FIG. 2 shows a further embodiment of a system for preventing Internet attacks, according to the present disclosure.

Referring to FIGS. 1 and 2, the system 1 comprises a Traffic Inspector 2 in signal communication with at least one client computer 3 having a Web browser 4 residing therein for Internet browsing.

The Traffic Inspector 2 is in signal communication with a Web server 5 having a Web application 6 residing therein.

In one aspect, a user can use the Web browser 4 in the client computer 3 to request a Web application 6 (e.g. a Web page) residing in a Web server 5. In other words, a user (or client) uses the Web browser 4 installed in the client computer 3 to access a Web page. Obviously, during use, the client computer 3 shall be connected to an Internet network through wired or mobile telephone equipment or any other known communication method.

The Traffic Inspector 2 is configured to receive at least one request associated with the Web application 6 from the Web browser 4 and to send such request to the Web server 5.

The Traffic Inspector 2 is configured to receive a request-related DOM server code from the Web server 5. Namely, the request is generated by the Web browser 4 when the user uses the Web browser 4 to request a URL (Uniform Resource Locator) that uniquely identifies the address of an Internet resource (i.e. the Web application 6) residing in the Web server 5.

Preferably, the Traffic Inspector 2 is configured to receive at least the request associated with the Web application 6 from the Web browser 4 using the HTTP or HTTPS protocol and to send such request to the Web server 5.

According to a preferred embodiment, the Traffic Inspector 2 is designed to be installed as a software component in the Web application 6 and/or as a firewall software module and/or load balancer and/or network apparatus and/or a hardware device and/or a software module in the Web server 5 which hosts the Web application 6.

Preferably, the Traffic Inspector 2 is installed in the same network as the Web application 6 (e.g. on-premises) or is provided as an external service (e.g. SaaS or Cloud).

The system 1 comprises a Traffic Analyzer 7 with an algorithm application 8 residing therein. Such Traffic Analyzer 7 is in signal communication with the Traffic Inspector 2.

According to a preferred arrangement, the Traffic Inspector 2 and/or the Traffic Analyzer 7 are software components. More preferably, the Traffic Inspector 2 and/or the Traffic Analyzer 7 are components of a dedicated server.

Preferably, the Traffic Inspector 2 and the Traffic Analyzer 7 communicate by sending jobs, and these jobs can be transmitted through one or more known communication protocols, such as TCP, UDP, HTTP(S) and IMAP.

Advantageously, the Traffic Analyzer 7 is external to the data flow of HTTP/HTTPS requests, and can act independently of such data flow.

The Traffic Inspector 2 is configured to add an agent code portion to the DOM server code, to thereby generate a DOM client code. Furthermore, the Traffic Inspector 2 is configured to send the DOM client code to the Web browser 4.

Referring to the above, the DOM client code (e.g., the HTML code) is received and processed by the rendering engine of the Web browser 4 such that the contents of the Web application 6 may be displayed to the user as hypertext (e.g., a Web page).

Furthermore, the Traffic Inspector 2 is configured to receive a DOM rendered code associated with the DOM client code from the Web browser 4.

In other words, the DOM rendered code results from DOM client code processing by the rendering engine of the Web browser 4.

Therefore, the DOM client code is the code that may be potentially altered by malware for Man-in-the-Browser or Man-in-the-Middle attacks. As mentioned above, malware tampers with the internal functions of the browser (which is also known as hooking) by changing the DOM client code before it is transferred to the rendering engine of the Web browser 4. Therefore, if the DOM client code is altered, then the DOM rendered code is also altered.

According to a preferred arrangement, the DOM server code is a HTML code and/or a javascript code associated with the request.

Preferably, the agent code portion is a HTML code and/or a javascript code.

It should be noted that the DOM client code comprises at least the DOM server code and the agent code portion.

According to a preferred embodiment, the agent code portion is a default code, which is preferably configured to provide at least one instruction to the Web browser to send the DOM rendered code to the Traffic Inspector 2.

The Traffic Inspector 2 is configured to send at least the DOM client code and the DOM rendered code to the Traffic Analyzer 7.

The algorithm application 8 in the Traffic Analyzer 7 is configured to process the DOM rendered code and compare it with the DOM client code to identify at least one code difference. Preferably, the algorithm application 8 is configured to generate an attack-indicative signal (e.g. MitB Alert), when it identifies at least one code difference that can be related to an Internet attack, such as a Man-in-the-Browser (MitB) attack.

According to a preferred arrangement, the algorithm application 8 processes the DOM rendered code to provide an estimate of the expected DOM client code. In more detail, the algorithm application 8 is configured to provide an estimate of the expected DOM client code that has been processed by the rendering engine of the Web browser 4 to generate the DOM rendered code. The expected DOM client code is compared with the original DOM client code (i.e., the one that was originally received by the client computer 3) to identify the compatibility between the two codes. In other words, the two expected/original DOM client codes are either identical and coincident, if no change has been made to the DOM client code before rendering, or similar and compatible if code differences are not caused by the presence of malware.

According to the present invention, the two expected/original DOM client codes are incompatible when the algorithm application 8 identifies at least one code difference that may be related to an Internet attack (such as a MitB attack).

Preferably, the algorithm application 8 is manually implemented by a programmer or by means of a learning system, and hence it is variable with time (polymorphism). More preferably, the learning system whereby the algorithm application 8 is implemented is based, for instance, on statistical analysis of the particular behavior of the Web browser 4 (e.g. User Agent Spoofing).

As used in the present invention "algorithm application" is intended to designate a program or a series of programs that are being executed in the Traffic Analyzer 7 to allow comparison of the DOM client code with the DOM rendered code to check for incompatibility therebetween. Particularly, the algorithm application 8 is a program or a series of programs that can process the DOM rendered code to compare it with the DOM client code. For example, the algorithm application 8 uses a default and appropriately configured function to provide an estimate of the expected DOM client code (i.e., the code that has been potentially changed by the malware) that has been received and processed by the rendering engine of the Web browser 4. This default function changes with time (polymorphism) due to a learning mechanism which accounts for the behavior of the particular Web browser for which it has been implemented. This means that the default function is specific for each Web browser 4, as each Web browser 4 renders the DOM client code in its specific manner. In other words, the default function of the algorithm application 8 performs an "inverse function" of the DOM rendered code. Thus, once it has received the DOM rendered code, it can provide an estimate of the expected DOM client code that has been actually processed by the Web browser 4. This is possible because the default function accounts for the behavior of the Web browser 4. The expected DOM client code estimated by the default function is compared with the DOM client code by means of a comparison function such as a plain-text diff, to generate a set of snippet codes containing the differences detected between the DOM client code and the expected DOM client code. Such snippets are the code portions that have been potentially injected by the malware.

As used herein, the term "text diff" is intended as an application that can compare two texts (e.g. HTML code texts) and extract differences therefrom.

In other words, "text diff" is a program (i.e. a comparison function) which highlights differences between two files by plain-text comparison between their two respective codes (e.g. by text overlay, keyword detection, spell checking).

According to a preferred embodiment, the algorithm application 8 resides in the Traffic Inspector 2 and/or the client computer 3 and/or the Web server 5. Preferably, the algorithm application 8 is divided into sub-functions executed on a plurality of software components. Preferably, such sub-functions are executed in the Traffic Inspector 2 and/or the Traffic Analyzer 7 and/or the client computer (e.g. the Web browser 4) and/or the Web server 5.

According to a preferred embodiment, before performing a "text diff" comparison of the two DOM codes, the Traffic Analyzer 7 or the Traffic Inspector 2 processes the DOM client code and the DOM rendered code to standardize the two codes and allow comparison therebetween.

This process includes, for example, whitespace and carriage return removal, and character-encoding management.

For brevity, reference will be made hereinafter to the comparison between the DOM client code and the DOM rendered code to intend all the steps performed by the algorithm application 8, such as application of the default function, text diff comparison and DOM code standardization.

As mentioned above, the comparison (possibly by "text diff") between the DOM client code and the DOM rendered codes allows extraction of code differences, also known as snippets.

Each snippet is uniquely identified by its MD5 Hash.

In addition, each snippet is associated with the basic metadata that will form the cluster for analysis, such as the User Agent (i.e. the type of Web browser 4 that is used by the user). This is required because each User Agent (i.e. Web browser 4) processes the DOM client code received before, during or after the processing or rendering process in a different manner.

For example, some snippets identify minor changes (e.g. white space removal, code indentation, reordering of parameters in the individual tags), or structural changes (e.g. addition of closing tags when there are none, code formatting when the code contains errors in its original HTML format).

Some other snippets identify changes made by the Web browser 4, such as the scripts contained in the Web resource or Web page or the scripts generated by the resource or page itself, which modify the code on the rendered Web resource or page. Such snippets are also known as application snippets.

Some more snippets, known as external snippets, may be generated, for instance, by browser plug-ins, namely malware which act by the Man-in-the-Browser technique or are introduced by Man-in-the-Middle techniques.

As mentioned above, malware tampers with the internal functions of the browser (which is also known as hooking) by changing the DOM client code before it is transferred to the rendering engine of the Web browser 4.

The extracted differences (i.e. snippets) are analyzed by the comparison function and other functions of the algorithm application 8.

These differences (or snippets) may be of insertion or removal type.

Preferably, each of these snippets is assessed with respect to a baseline (e.g. a statistically-based baseline), which is organized by specific clusters (e.g. snippets classed by User Agent or by operating system).

The Traffic Analyzer 7 may be configured to send at least the attack-identification signal to a Traffic Inspector 2, and/or to save the signal information, and/or send the signal to an external system.

As shown in FIG. 2, according to one arrangement, the system 1 comprises a Computer Administrator 9 in signal communication with the Traffic Inspector 2 and the Traffic Analyzer 7, and configured to allow a user to program and monitor the operation of the Traffic Inspector 2 and the Traffic Analyzer 7.

Preferably, the Traffic Inspector 2 is configured to receive the attack-identification signal and to send at least the attack-identification signal to the Web browser 4.

Preferably, the Traffic Analyzer 7 is configured to send the attack-identification signal to a Computer Administrator 9 and/or an external system.

According to a preferred embodiment, the algorithm application 8 in the Traffic Analyzer 7 is configured to compare at least the DOM client code and the processed DOM rendered code to generate at least one attack-identification code when the DOM client code is incompatible with the DOM rendered code.

According to a preferred embodiment, the Computer Administrator 9 is a control panel, through which the user may:
- monitor the status of the system 1;
- view, inspect, and/or monitor requests and traffic in real time;
- view, inspect, and/or monitor request and traffic history;
- monitor, set, and manage attack-identification signals (e.g., security alerts) or information signals; and/or
- display, manage, and/or make changes to system 1 configurations and system components.

Advantageously the system 1 provides a comprehensive overview of what happens during a session, because it analyses the individual requests.

Advantageously, the system 1 of the present invention allows effective and secure identification and counteraction of Man-in-the-Browser and/or Man-in-the-Middle attacks, thereby affording full monitoring of user requests.

The present invention also relates to a method of identifying Man-in-the-Browser and/or Man-in-the-Middle Internet attacks using the system 1 of the present invention, which comprises the steps of:
- generating a request for a Web application 6 or Web resource via a Web browser 4 using a Uniform Resource Identifier ("URI") or Uniform Resource Locator ("URL");
- sending the request to a Web server 5 using a Traffic Inspector 2;
- receiving the DOM server code which has been automatically generated by the Web server 5 according to the request, by the Traffic Inspector 2;
- adding an agent code portion to the DOM server code, by the Traffic Inspector 2, to thereby generate a DOM client code and send the DOM client code to the Web browser 4;
- receiving and processing the DOM client code by the Web browser 4 to automatically generate a DOM rendered code and send the DOM rendered code to the Traffic Inspector 2;
- receiving the DOM rendered code by the Traffic Inspector 2 and automatically sending the DOM client code and the DOM rendered code to a Traffic Analyzer 7; and/or
- receiving, processing, and comparing at least the DOM client code and the DOM rendered code, by an algorithm application 8 residing in the Traffic Analyzer 7, to generate at least one attack-identification signal when the DOM client code is incompatible with the DOM rendered code.

According to a preferred embodiment, the step of sending the request comprises the steps of:
- sending the request using HTTP or MIPS protocol;
- the agent code portion being HTML, JavaScript code, another type of code that can be interpreted by a Web browser, and/or another type of language that can be interpreted by the Web browser; and/or
- the DOM client code comprising at least the DOM server code and the agent code portion.

According to a preferred embodiment, the step of receiving and processing the DOM client code for automatic generation of the rendered DOM code comprises the steps of:
- receiving the DOM client code by the Web browser 4,
- processing the DOM server code contained in the DOM client code by the Web browser 4 to automatically generate a DOM rendered code,
- processing the agent code portion contained in the DOM client code by the Web browser 4 to send the DOM rendered code to the Traffic Inspector 2.

According to a preferred embodiment, the step of receiving and comparing at least the DOM client code and the DOM rendered code, by the algorithm application 8 residing in the Traffic Analyzer 7, to generate at least one attack-identification signal when the DOM client code is incompatible with the DOM rendered code comprises the step of:
- sending the attack-identification signal to the Traffic Inspector 2, the Web browser 4, a Computer Administrator 9, and/or an external unit.

According to a preferred embodiment, the step of receiving and comparing at least the DOM client code and the DOM rendered code, by the algorithm application 8 residing in the Traffic Analyzer 7, to generate at least one attack-identification signal when the DOM client code is incompatible with the DOM rendered code comprises the step of:
- receiving and comparing at least the DOM client code and the DOM rendered code, by the algorithm application 8 residing in the Traffic Analyzer 7, by executing a comparison function to generate at least one attack-identification signal when the DOM client code is incompatible with the DOM rendered code.

An application example of the method of the present invention is described below.

Figure 3:
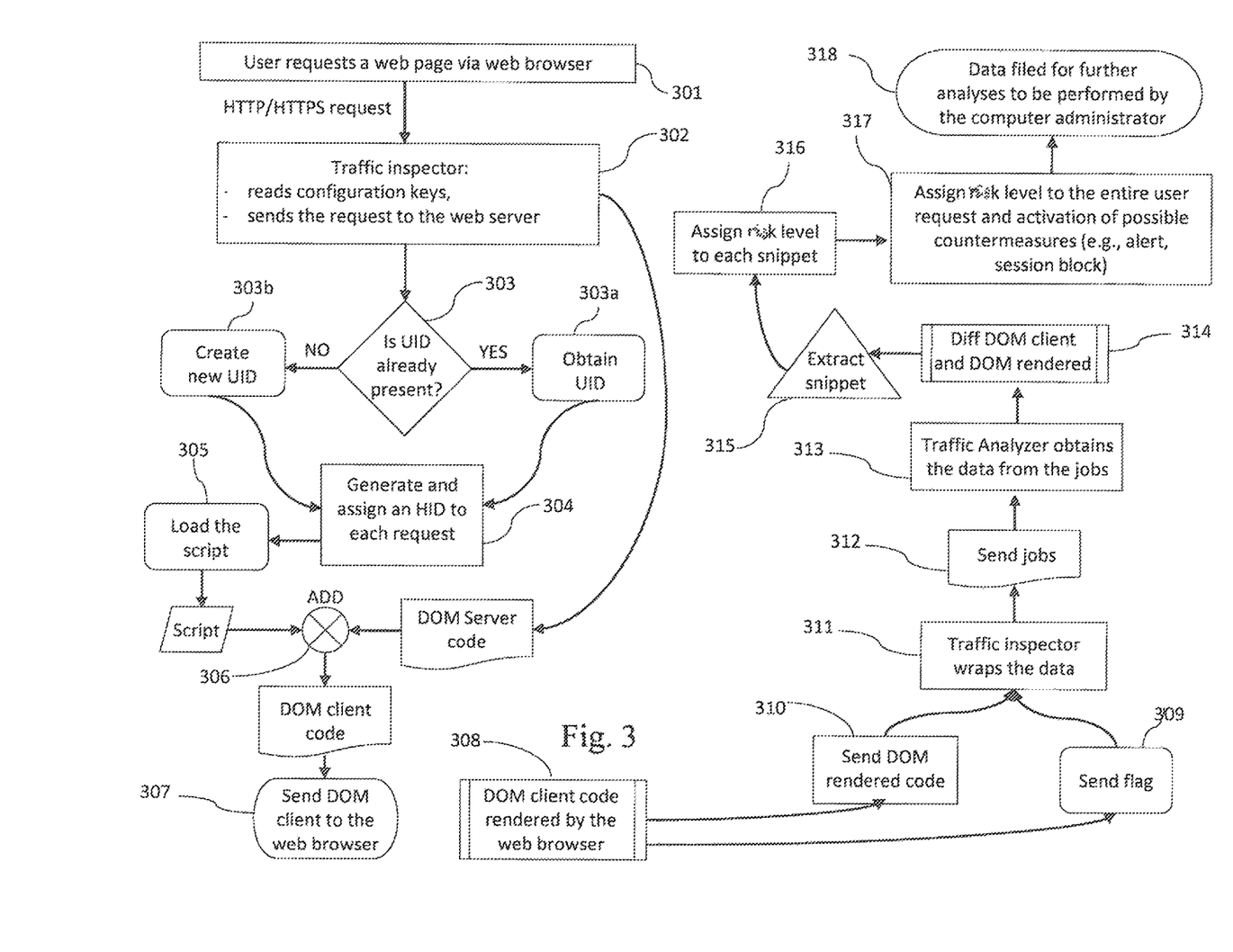
FIG. 3 shows a flowchart of the method of preventing Internet attacks, according to the present disclosure.

Application Example of the Method—FIG. 3

The method includes the following steps:

The user requests a resource or page of the Web site or application of interest, from the client computer 3 (block 301), using a URI or URL (resource ID). The Web browser 4 generates a HTTP or HTTPS request for direct transmission to a Traffic Inspector 2 installed at same site as the Web application 6 or available in a Cloud environment.

The Traffic Inspector 2 acts as a reverse proxy system, reads the hostname, and checks the original hostname, address, URL or URI of the location of the web application 6 being monitored and protected against its configuration keys. The Traffic Inspector 2 sends the HTTP or HTTPS request to the Web server 5 and obtains the DOM server code (including cookies, headers and other information) of the requested page (block 302).

The Traffic Inspector 2 determines whether a User Identifier ("UID") (i.e., a user code) is already present (block 303). If the user has already made requests, the Traffic inspector 2 reads the UID that has been sent by the client computer 3, for instance through a cookie contained and pre-registered in the Web browser 4 of the user block 303*a*), or generates and sends a new one (block 303*b*).

The Traffic Inspector 2 randomly assigns a unique Hypertext Identifier ("HID") (i.e., a request code) to each individual HTTP or HTTPS request (block 304).

The Traffic Inspector 2 loads (block 305) and adds (block 306) an agent code portion (e.g., a script) into the DOM server code of the requested page. The above-mentioned script may be HTML and/or JavaScript code providing a series of functions and a series of flags. As used herein, the term "flag" is intended to designate a variable (e.g., a Boolean variable) which may assume either of two states (e.g., "true" or "false", "on" or "off", "1" or "0") and indicates by its value whether a given event has actually occurred or whether the system is in a certain state or not. Flags are used in a code for certain operations to be automatically carried out only as a given state is reached or a given event has occurred. The script or agent code portion may be differentiated according to the UID or the IP address from which the request was made or according to any other variable that can be set within the system 1, such that custom scripts may be added for individual users of user groups.

The Traffic Inspector 2 sends the DOM client code, composed of the DOM server code and the agent code portion or script, to the Web browser 4 (block 307).

The Web browser 4 of the user receives the DOM client code, renders the page, and automatically starts the operation of the script or agent code portion (block 308).

Once the Web browser 4 has completed the rendering process or has executed the script or agent code portion, it sends data to the Traffic Inspector 2 via a dedicated path, which may be fixed (e.g., http(s)://webapplication/check) or variable (e.g., http(s)://webapplication/fj1c3f4), such data being for example:

a. Flags for checking the rendering behavior and identifying, for example, a BOT or a JavaScript disabling event (block 309); and/or
b. the DOM rendered code (block 310)

The Traffic Inspector 2 receives such data via the fixed or variable dedicated path and asynchronously packs (block 311) and sends (block 312) it to the Traffic Analyzer 7, for instance by creating a job. The Job comprises, for instance, the following data:

a. Metadata (e.g., IP address, User-Agent, request Date/Time, Content-Length, Referrer, Host, UID, HID);
b. DOM client code; and/or
c. DOM rendered code.

The Traffic Analyzer 7 acquires the data and starts an analysis based on the algorithm application 8 (block 313).

The algorithm application 8 processes the DOM rendered code and reconstructs an estimate of the expected DOM client code. Also, it makes a comparison between the DOM client code and the expected DOM client code, extracts the (additive or subtractive) differences, and independently classifies them (block 314). Each of these differences is known as a snippet (block 315).

The algorithm application 8 processes the differences to assess the risk level of the identified snippets (block 316). Certain snippets are caused by the user browser, and are called browser behavioral snippets (e.g. ordering of parameters, addition of non-closed tags), other snippets are external snippets added by a plug-in or by malware (e.g. Zeus), others are application snippets, which are generated and added by the Web application.

Once the Traffic Analyzer 7 has completed its analysis, it assigns a risk level to the HTTP or HTTPS request and possibly takes countermeasures, such as alerts, warnings or traffic block (block 317).

All the data is stored and is available to the manager of the Web application 6 via the Computer Administrator 9 (block 318).

An application example of the steps carried out by the algorithm application 8 of the present invention is described below.

Figure 4:
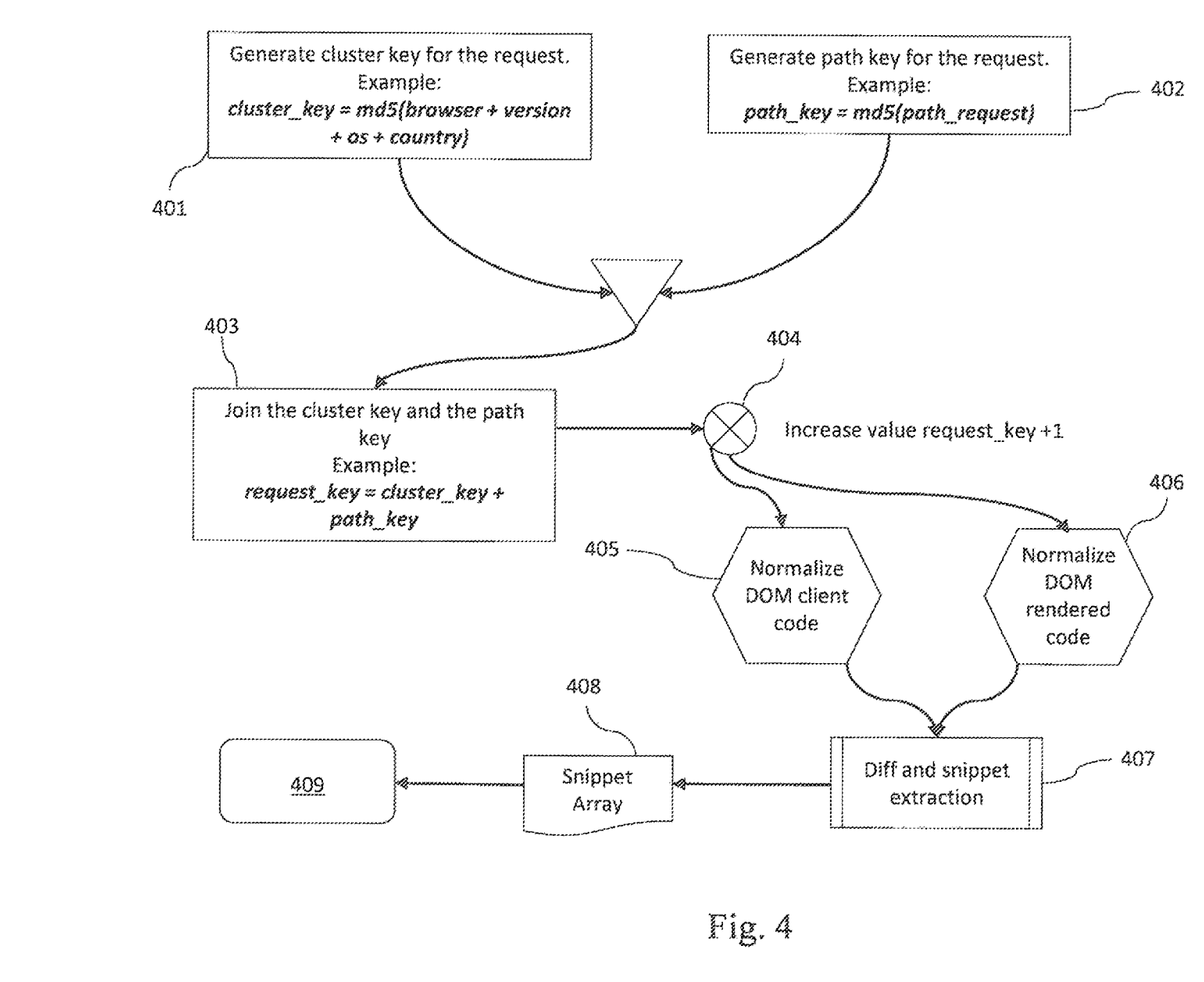
FIG. 4 shows a flowchart of a particular step of the method of preventing Internet attacks, according to the present disclosure.

The algorithm application 8, also referring to FIG. 4, has a statistically-based mathematical operation, including the steps described immediately below with respect to blocks 401-409.

Block 401 shows creating a cluster key for the request. The key is created, for instance, by hashing (e.g., md5 hashing) of cluster-specific environment variables (e.g. browser, browser version, OS, OS version, country). One example is as follows:

cluster_key=md5(browser+version+OS+country)

Block 402 shows creating a path key for the request. The key is created, for instance, by hashing (e.g., md5 hashing) of the URL of the HTTP or HTTPS request. One example is as follows:

path_key=md5(path_request)

Block 403 shows joining the cluster key and the path key for the request, thereby defining the request key. One example is as follows:

request_key=cluster_key+path_key

Block 404 shows increasing the value of the request key. One example is as follows:

increment(request_key,1)

Blocks 405 and 406 show normalizing the DOM client code (block 405) and the DOM rendered code (block 406). Examples are as follows:

normalized_dom_rendered=normalize(dom_rendered)

normalized_dom_client=normalize(dom_client)

Blocks 407 and 408 show executing the comparison function to compare the normalized DOM rendered code and the normalized DOM client code (block 407) to obtain the list of snippets (block 408). One example is as follows:

snippet_array=compare(normalized_dom_rendered, normalized_dom_client)

Figure 5:
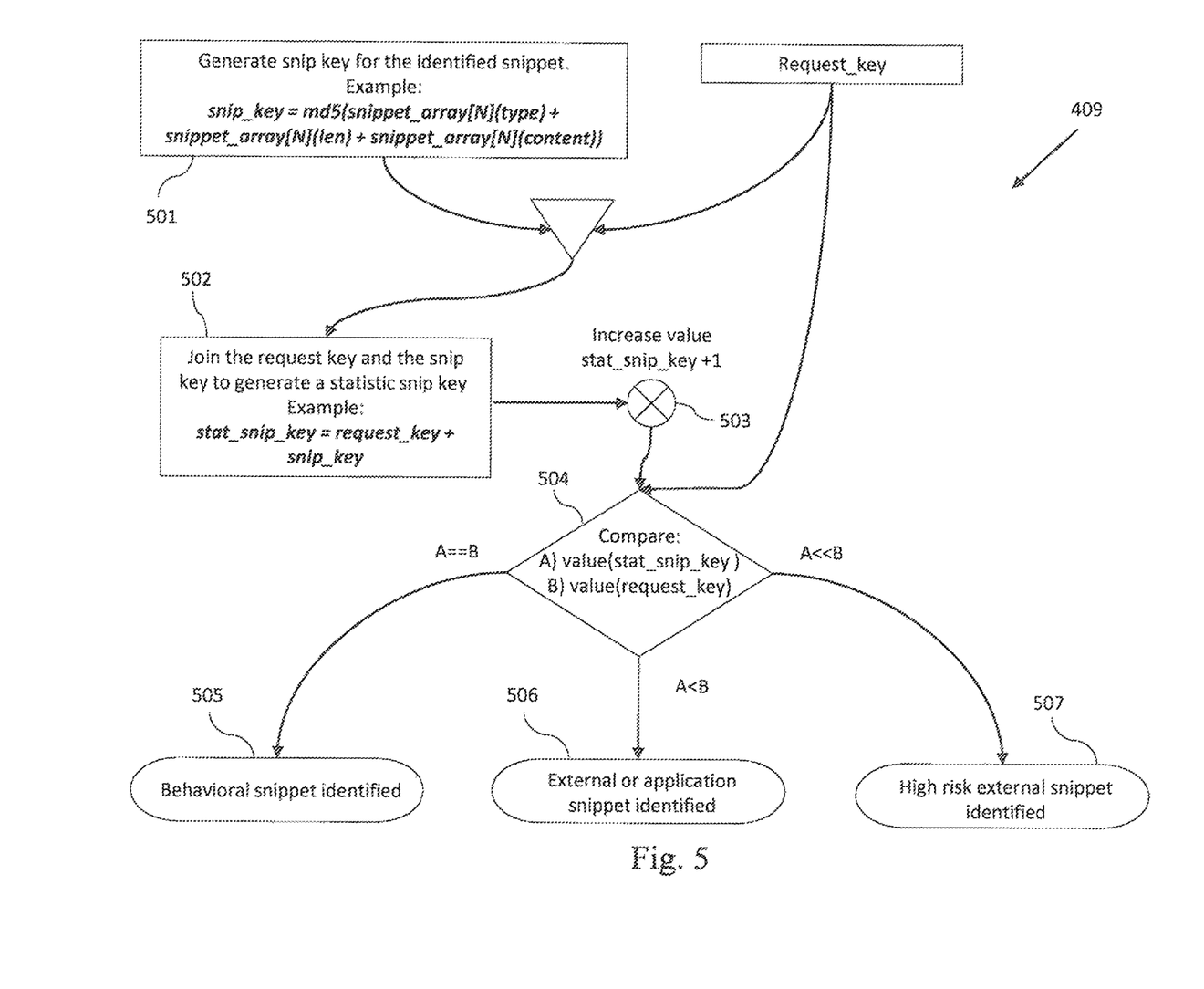
FIG. 5 shows a flowchart of a particular substep of the method of preventing Internet attacks, referring to FIG. 4.

Block 409 shows carrying out, for each element of the snippet_array, the steps block 409 related to FIG. 5.

In this respect and with reference to FIG. 5, there is a step a in which a key for the identified snippet is created (block 501). The key is created by hashing (e.g., md5 hashing) of the snippet-specific variables (e.g., content, type [insert, delete], size). One example is as follows:

a. snip_key=md5(snippet_array[N](type)+snippet_array[N](len)+snippet_array[N](content))

Further to FIG. 5, additional example steps include:
b. Joining the snippet key and the request key to obtain a statistical snippet key (block 502). One example is as follows:

stat_snip_key=request_key+snip_key c. Increasing the value of the stat_snip_key (block 503). One example is as follows:

increment(stat_snip_key,1)

d. Comparing the request_key value with the stat_snip_key value to define the risk level of the identified snippet (block 504). For example, the comparison is as follows:

i. if extract_value_of(stat_snip_key)==extract_value_of(request_key) then low risk level when a behavioral snippet has been identified (block 505).

ii. if extract_value_of(stat_snip_key)<extract_value_of(request_key) then medium risk level when an application snippet or an external snippet (e.g., a browser plug-in) has been identified (block 506).

iii. if extract_value_of(stat_snip_key)<<extract_value_of(request_key) then high risk level when a high-risk Man-in-the-Browser or Man-in-the-Middle external snippet has been identified (block 507).

In other words, the peculiar feature of the algorithm application 8 consists in the comparison of the number of occurrences of a snippet within the cluster.

If the number of occurrences is reasonably close to the baseline, the snippet is a browser-related behavioral snippet and/or a snippet caused by a massively widespread plug-in.

In this case, the algorithm assigns a low or zero risk level.

However, if the number of occurrences departs from the baseline, then there is an unexpected, non-trivial difference.

Depending on a number of factors (e.g. the length of the modified code, the type of injected code), the algorithm application 8 assigns a medium-to very high risk level.

Advantageously the system 1 provides a comprehensive overview of what happens during a session, because it analyses the individual requests.

For example, the method implemented by the system 1 can detect:

Whether the request comes from a human user or a BOT;
Whether the request has "reasonable" or "unreasonable" timings;
The User Agent and IP address from which the request comes; and/or
The UID from which the request comes.

Advantageously, the method of the present invention affords full tracking of the user (i.e. the client user), and session monitoring.

According to a preferred embodiment, the method comprises the steps of:

automatically removing malicious snippets, by providing feedback on the user's Web browser 4;
obtaining screenshots and behavior analysis of the user on the page;
analyzing the user path on the Web site through the request timeline;
modifying the DOM server code by changing attribute values, link values, forms, fields, and/or functions of HTML and/or JavaScript code; and/or
modifying the DOM server code by adding, modifying, and/or reorganizing its content.

Advantageously, the method 1 of the present invention allows effective and secure identification and counteraction of Man-in-the-Browser and/or Man-in-the-Middle through the use of the system 1 attacks, thereby affording full monitoring of user requests.

Those skilled in the art will obviously appreciate that a number of changes and variants as described above may be made to fulfill particular requirements, without departure from the scope of the invention, as defined in the following claims.

The invention claimed is:

1. A system for identifying Internet attacks, the system comprising:
a Web server having a Web application residing therein, wherein the Web server is a hardware device;
a Traffic Inspector; and
a Traffic Analyzer;
wherein the Traffic Inspector is configured to be in signal communication with the Web server and with at least one client computer having a Web browser residing therein for Internet browsing;
wherein the Traffic inspector is further configured to receive at least one request associated with the Web application from the Web browser, and is configured to send the at least one request to the Web server when requested by a user of the client computer via the Web browser;
wherein the Traffic Inspector is further configured to receive request-related Document Object Model (DOM) server code from the Web server;
wherein the Traffic Analyzer has an algorithm application residing therein;
wherein the Traffic Analyzer is configured to be in signal communication with the Traffic Inspector;
wherein the Traffic Inspector is further configured to add an agent code portion to the DOM server code, to thereby generate DOM client code, and is configured to send the DOM client code to the Web browser;
wherein the Traffic Inspector is further configured to receive DOM rendered code associated with the DOM client code from the Web browser;
wherein the DOM rendered code s automatically generated by the Web browser according to the at least one request;
wherein the agent code portion is configured to automatically instruct the Web browser to send the DOM rendered code to the Traffic Inspector;
wherein the Traffic Inspector is further configured to send at least the DOM client code and the DOM rendered code to the Traffic Analyzer; and
wherein the algorithm application is configured to process the DOM rendered code and to compare the processed DOM rendered code with the DOM client code to identify at least one code difference.

2. The system of claim 1, wherein the Traffic Inspector is further configured to receive at least the at least one request associated with the Web application from the Web browser using Hypertext Transfer Protocol (HTTP) or Hypertext Transfer Protocol Secure (HTTPS) and to send the request to the Web server.

3. The system of claim 1, wherein the DOM server code is Hypertext Markup Language (HTML), JavaScript code, or HTML and JavaScript code associated with the at least one request,
wherein the agent code portion is HTML, JavaScript code, or HTML and JavaScript code, and
wherein the DOM client code comprises at as e DOM server code and the agent code portion.

4. The system of claim 1, wherein the Traffic Analyzer is further configured to generate an attack-identification signal when the algorithm application identifies the at least one code difference,
wherein the Traffic Analyzer is further configured to send the attack-identification signal to one or more of the Traffic Inspector, the Web browser, a Computer Administrator, or to a unit external to the system, or
wherein the Traffic Analyzer is further configured to save the attack-identification signal in a database.

5. The system of claim 1, wherein the algorithm application residing in the Traffic Analyzer is further configured to process the DOM rendered code to compare the processed DOM rendered code with the DOM client code using a comparison function to generate at least one attack-identification signal when the DOM client code is incompatible with the DOM rendered code.

6. The system of claim 1, wherein the Traffic Inspector is a component of the Web server.

7. The system of claim 1, wherein the Traffic Analyzer is a component of the Web server.

8. The system of claim 1, wherein the Traffic Inspector is a component of the Web server, and
wherein the Traffic Analyzer is a component of the Web server.

9. The system of claim 1, wherein the Traffic Inspector is in a same network as the Web application.

10. The system of claim 1, wherein the Traffic Inspector is a component of the Web server, or
wherein the Traffic Analyzer is a component of the Web server.

11. A method of identifying Man-in-the-Browser Internet attacks, Man-in-the-Middle Internet attacks, or Man-in-the-Browser and Man-in-the-Middle Internet attacks using a system comprising a Web server having a Web application residing therein; a Traffic Inspector; and a Traffic Analyzer, the method comprising:
generating a request for the Web application or a Web resource via a Web browser using a Uniform Resource Identifier (URI) or Uniform Resource Locator (URL);
sending the request to the Web server using a Traffic Inspector;
receiving Document Object Model (DOM) server code by the Traffic Inspector, the DOM server code having been automatically generated by the Web server according to the request;
adding an agent code portion to the DOM server code, by the Traffic Inspector, to thereby generate DOM client code and send the DOM client code to the Web browser;
receiving and processing the DOM client code by the Web browser to automatically generate DOM rendered code and to automatically send the DOM rendered code to the Traffic Inspector;
receiving the DOM rendered code by the Traffic Inspector and automatically sending the DOM client code and the DOM rendered code to a Traffic Analyzer; and
receiving, processing, and comparing at least the DOM client code and the DOM rendered code, by an algorithm application residing in the Traffic Analyzer, to generate at least one attack-identification signal when the DOM client code is incompatible with the DOM rendered code.

12. The method of claim 11, wherein said step of sending said request comprises the step of:
sending the request using Hypertext Transfer Protocol (HTTP) or Hypertext Transfer Protocol Secure (HTTPS);
wherein the agent code portion is one or more of Hypertext Markup Language (HTML), JavaScript code, another type of code that can be interpreted by a Web browser, or a language that can be interpreted by the Web browser, or any combination, and
wherein the DOM client code comprises at least the DOM server code and a default code portion.

13. The method of claim 12, wherein said step of receiving and processing said DOM client code for automatic generation of said rendered DOM code comprises the steps of:
receiving the DOM client code by the Web browser;
processing the DOM server code contained in the DOM client code by the Web browser to automatically generate the DOM rendered code; and
processing the agent code portion contained in said DOM client code by the Web browser to send the DOM rendered code to the Traffic Inspector.

14. The method of claim 11, wherein the receiving, processing, and comparing of the at least the DOM client code and the DOM rendered code, by the algorithm application residing in the Traffic Analyzer, to generate the at least one attack-identification signal when the DOM client code is incompatible with the DOM rendered code comprises:
sending the attack-identification signal to one or more of the Traffic Inspector, the Web browser, a Computer Administrator, or a unit external to the system, or any combination thereof.

15. The method of claim 11, wherein the receiving, processing, and comparing of the at least the DOM client code and the DOM rendered code, by the algorithm application residing in the Traffic Analyzer, to generate the at least one attack-identification signal when the DOM client code is incompatible with the DOM rendered code comprises:
receiving, processing, and comparing at least the DOM client code and the DOM rendered code, by the algorithm application residing in the Traffic Analyzer by executing a comparison function, to generate the at least one attack-identification signal when the DOM client code is incompatible with the DOM rendered code.

16. A system for identifying Internet attacks, the system comprising:
a first server, wherein the first server is a hardware device;
a Traffic Inspector; and
a Traffic Analyzer;
wherein the Traffic Inspector is configured to be in signal communication with a second server having a Web application residing therein and with at least one client computer having a Web browser residing therein for Internet browsing;
wherein the Traffic Inspector is further configured to receive at least one request associated with the Web application from the Web browser, and is configured to send the at least one request to the second server when requested by a user of the client computer via the Web browser;
wherein the Traffic inspector is further configured to receive request-related Doc n Object Model (DOM) server code from the second server;
wherein the Traffic Analyzer has an algorithm application residing therein;
wherein the Traffic Analyzer is configured to be in signal communication with the Traffic Inspector;
wherein the Traffic Inspector is further configured to add an agent code portion to the DOM server code, to thereby generate DOM client code, and is configured to send the DOM client code to the Web browser;
wherein the Traffic inspector is further configured to receive DOM rendered code associated with the DOM client code from the Web browser;
wherein the DOM rendered code is automatically generated by the Web browser according to the at least one request;
wherein the agent code portion is configured to automatically instruct the Web browser to send the DOM rendered code to the Traffic Inspector;
wherein the Traffic Inspector is further configured to send at least the DOM client code and the DOM rendered code to the Traffic Analyzer;
wherein the algorithm application is configured to process the DOM rendered code and to compare the processed DOM rendered code with the DOM client code to identify at least one code difference; and
wherein the Traffic inspector is a component of the first server.

17. The system of claim 16, wherein the first server is the same as the second server, and
   wherein the agent code portion is Hypertext Markup Language (HTML) code, JavaScript code, or HTML, and JavaScript code.

18. The system of claim 16, wherein the first server differs from the second server.

19. The system of claim 16, wherein the Traffic Analyzer is also a component of the first server.

\* \* \* \* \*